United States Patent
Iwazawa et al.

[11] Patent Number: 5,990,651
[45] Date of Patent: Nov. 23, 1999

[54] STEPPING MOTOR DRIVE APPARATUS AND STEPPING MOTOR

[75] Inventors: Naotoshi Iwazawa; Shigeru Shimonou, both of Tokyo, Japan

[73] Assignee: NEC Corporation, Tokyo, Japan

[21] Appl. No.: 09/123,158

[22] Filed: Jul. 27, 1998

[30] Foreign Application Priority Data

Jul. 28, 1997 [JP] Japan .................................. 9-201206

[51] Int. Cl.$^6$ ................................................ G05B 19/40
[52] U.S. Cl. ......................... 318/685; 318/696; 318/560
[58] Field of Search .................................. 318/685, 696, 318/560

[56] References Cited

U.S. PATENT DOCUMENTS

| | | | |
|---|---|---|---|
| 5,796,194 | 8/1998 | Archer et al. ............................ | 318/439 |
| 5,850,130 | 12/1998 | Fujisaki et al. ........................... | 318/439 |

FOREIGN PATENT DOCUMENTS

| | | | |
|---|---|---|---|
| 60-51777 | 4/1985 | Japan ............................. | H02K 29/06 |
| 6051777 | 4/1985 | Japan . | |
| 60-162464 | 8/1985 | Japan ............................. | H02K 29/00 |
| 61-75214 | 4/1986 | Japan ............................. | G01D 5/245 |
| 61-88796 | 5/1986 | Japan ................................. | H02P 8/00 |
| 62-244264 | 10/1987 | Japan ............................. | H02K 29/00 |
| 4222491 | 8/1992 | Japan ................................. | H02P 6/02 |
| 4269601 | 9/1992 | Japan ............................. | G01B 7/00 |
| 526923 | 2/1993 | Japan ............................. | G01R 25/00 |
| 5141984 | 6/1993 | Japan ............................. | G01D 5/245 |
| 612906 | 2/1994 | Japan ................................. | G01B 7/30 |
| 688705 | 3/1994 | Japan ................................. | G01B 7/30 |
| 6323806 | 11/1994 | Japan ................................. | G01B 7/30 |

*Primary Examiner*—Karen Masih
*Attorney, Agent, or Firm*—Hayes Soloway Hennesey Grossman & Hage PC

[57] ABSTRACT

A stepping motor has Hall elements which detect the position of the rotor and which output detection signals that have the same period as the excitation period, and which leads the position of the rotor by 90 degrees. The stepping motor is driven by the output of a drive current that is obtained by multiplying the detection signals output from the Hall elements with a torque command signal that controls the output torque of the stepping motor.

15 Claims, 9 Drawing Sheets

Fig. 8
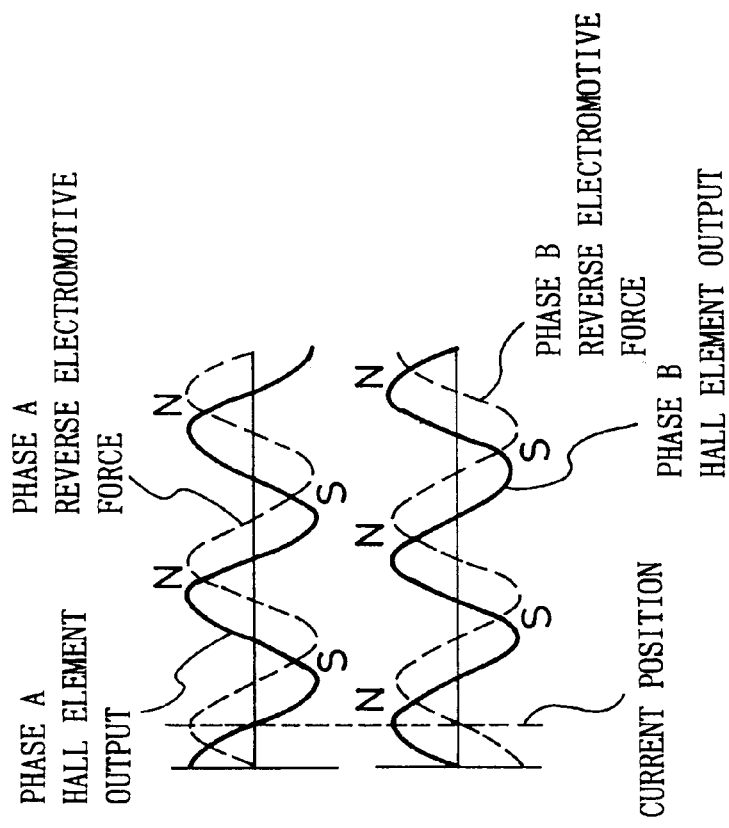
(A)
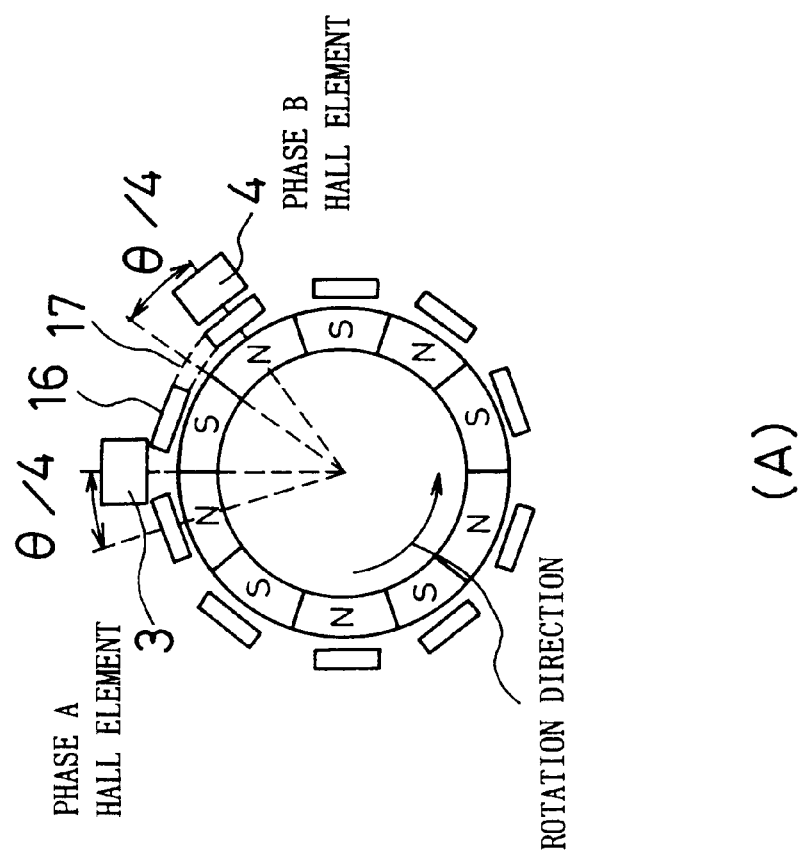
(B)

STEPPING MOTOR DRIVE APPARATUS AND STEPPING MOTOR

BACKGROUND OF THE INVENTION

1. Field of the Invention

The present invention relates to a stepping motor drive apparatus and to a stepping motor that are applied to a technical field in which high accuracy, high torque output, and high speed are required, such as in optical disk drives, printers, copying machines, robots, machine tools, and the like, and more specifically to a stepping motor drive apparatus and stepping motor that detect the position of a rotor so that close-loop control is performed.

2. Description of Related Art

A stepping motor having a plurality of excitation phases is generally driven by shifting the phase for each excitation phase with respect to number of phases as used and exciting each phase sequentially.

However, there are cases, depending upon specifications such as the rotational position accuracy of the equipment into which the stepping motor is built, in which a positioning accuracy greater than the intrinsic positioning accuracy of the stepping motor and a higher torque are required.

In such cases, the microstep driving method and method of performing closed-loop control with detecting the position of the rotor have been used in the past.

The microstep driving method is the generally used method that is one of driving the motor with a step that is smaller than the usual step, and an driver IC for this microstep driving method has already been made commercially available.

In contrast to this, the closed-loop control method of detecting the rotor position has been disclosed, for example, in the Japanese Unexamined Patent Publication (KOKAI) No. 61-88796 and No. 62-244264.

In the Japanese Unexamined Patent Publication (KOKAI) No. 61-88796, there is disclosure of sensor position detection apparatus which has a phase switcher which arbitrarily controls the switching of the excitation phases of a rotating-type or linear-type stepping motor, a position signal generation means which outputs an arbitrary signal having a period that is the same as the period of the balance point of each excitation phase, a timer which measures the time from the time at which an arbitrary excitation phase is excited in accordance with the control of the phase switcher, until the time at which the position detection signal output by the position signal generation means is detected, and a sensor position calculator which calculates, by means of the time measured by the timer, the distance between the excitation phase balance point and the detection point of the position signal generation means.

According to this sensor position detection apparatus, the timer is used to measure the amount of time required for the rotor to move from the balance point to the position signal detection point when the stepping motor is moves 1 step to the right or to the left and, based on this, the positional relationship between the motor balance point and the sensor detection point is determined, thereby having the effect of eliminating the need to perform positioning of the sensor detection point and the motor balance point.

In the Japanese Unexamined Patent Publication (KOKAI) No. 62-244264, there is disclosure of a motor drive apparatus in which the magnetic flux of a rotor, which is formed by a permanent magnet, is detected by a position detection element in order to perform control of the rotation of the rotor, wherein a magnet which is magnetized in the same manner as the rotor is fixed to the end surface of the rotor, and further wherein a position detection element is disposed in opposition to this magnet.

In this motor drive apparatus, a Hall element is used as the means to detect the rotational position of the rotor of the motor. The rotor of the motor is the same type of magnet as the stepping motor, the position being detected by the Hall element and the excitation being switched.

In consideration of the deterioration of the signal in this motor drive apparatus when a rotor magnet is used for detection of the magnetic flux by a Hall element, a separate magnet having the same magnetic poles with respect to the rotation direction is provided.

By doing this, signal quality deterioration is prevented. In this motor drive apparatus, the current value when current is driven through the coil of each of the phases is constant, this being used in applications with constant rotational speed.

In addition, the "position detection apparatus" of Japanese Unexamined Patent Publication (KOKAI) No. 6-323806, the "brushless DC motor drive apparatus" of Japanese Unexamined Patent Publication (KOKAI) No. 4-222491. and the "AC motor magnetic sensor" of Japanese Unexamined Utility Model Publication (KOKAI) No. 6-12906, for example, disclose examples of using a Hall element as a sensor for excitation switching in a DC brushless motor or AC motor.

In the above-described microstep drive method, because drive is done by a fine step, there is the problem that the rotational force becomes small and the torque characteristics deteriorate.

Additionally, because the resolution is finite, there is also a limit to positioning accuracy. While a method of increasing the resolution of the microstep method could be envisioned, the stepping motor excitation pattern is dependent on the intrinsic motor characteristics, and there is a limit to the improvement in resolution.

The "sensor position detection apparatus" disclosed in the Japanese Unexamined Patent Publication (KOKAI) No. 61-88796 detects the stepping motor rotor position and optimizes the excitation timing and, while this is effective in the case of driving a motor at a prescribed target speed, it is cannot be claimed to be particularly effective in the case of positioning the rotor by causing it to stop at a prescribed rotational position.

With a stepping motor of a closed-loop system in the past, a high-cost sensor, such as a rotary encoder or optical sensor or the like, was used at the sensor to detect the rotor position, this creating the problem of high equipment cost.

Because the "motor drive apparatus" that is disclosed in the Japanese Unexamined Patent Publication (KOKAI) No. 62-244264 has another permanent magnet that is magnetized with a number of poles that is the same as the rotor fixed to the end surface of the rotor, which is a permanent magnet, there is the problem of a complex construction.

Additionally, in the examples of the past which are disclosed in the Japanese Unexamined Patent Publication (KOKAI) No. 6-323806 and No. 4-222491 and in the Japanese Unexamined Utility Model Publication (KOKAI) No. 6-12906, the detection signals that are output from a Hall element are all converted to pulses for drive of the motor.

However, because a Hall element is disposed so as to be in proximity to the rotor, interference occurs because of the magnetic field of the coil, the influence of this interference resulting in a larger time skew when the analog signal is converted to a pulse signal. As a result, it is not possible to perform proper motor drive and, in certain cases, faulty operation can occur.

The present invention was made to solve the above-noted problems, and has as an object the provision of a low-cost stepping motor drive apparatus and stepping motor that provides high accuracy and high torque output.

SUMMARY OF THE INVENTION

To achieve the above-noted object, a stepping motor drive apparatus according to the present invention is a stepping motor drive apparatus that drives a stepping motor that has a rotor with a magnetic surface that is magnetized at a uniform interval to form North and South poles alternately thereon by imparting a drive current to each of the excitation phases of the stator thereof, so as to vary the magnetized condition of the excitation phases at a fixed period, this stepping motor drive apparatus having a rotor position detection means which detects the position of the rotor and outputs a detection signal that has the same period as the excitation period and that leads the rotor position by 90 degrees and a drive current output means, which multiplies the rotor position detection signal that is output by the rotor position detection means by a torque command signal that controls the output torque of the stepping motor, and which outputs a drive current.

According to the present invention, the rotor position detection means detects the rotor position, and the drive current output means multiplies the detection signal that is output by the rotor position detection means by the torque command signal that is output from an upstream device, and outputs a drive current.

Because the rotor position detection means outputs a detection signal that has the same period as the excitation period and which leads the rotor position by 90 degrees, when the drive current is applied to the stepping motor, because excitation is performed with a phase lead by 90 degrees, a torque is generated that acts so as to cause the rotor to rotate from the position of $\theta_0$ to $\theta_0 + \theta_d/4$, (where $\theta_0$ is the current rotor position, and $\theta_d$ is the rotational angle corresponding to the excitation period).

It is preferable that the above-noted rotor position detection means be a magnetic sensor that detects a change in the magnetic field of the rotor, such as a Hall element.

A stepping motor according to the present invention is one that has a rotor which has a magnetized surface that is magnetized at a uniform interval to form North and South poles and a stator having a plurality of excitation poles which are disposed so as to be in opposition to the rotor, each excitation phase of the stator having applied to it a drive current, so that the excitation condition changes at a fixed period, resulting in drive of the stepping motor.

This stepping motor further has a rotor position detection means which detects the position of the rotor and which outputs a detection signal that has the same period as the excitation period and that leads the rotor position by 90 degrees, the detection signal that is output by the rotor position detection means and a torque command signal which controls the output torque of the stepping motor being multiplied and output as a drive current to drive the motor.

It is preferable that the above-noted rotor position detection means be a magnetic sensor that detects a change in the magnetic field of the rotor, such as a Hall element.

BRIEF DESCRIPTION OF THE DRAWINGS

FIG. 8 (A) is a drawing which illustrates the position of the Hall element, and FIG. 8 (B) is a waveform diagram which shows the relationship between the rotational position of the rotor and the sensor signal.

DETAILED DESCRIPTION OF THE PREFERRED EMBODIMENTS

Embodiments of present invention are described below, with reference being made to the relevant accompanying drawings.

Figure 1:
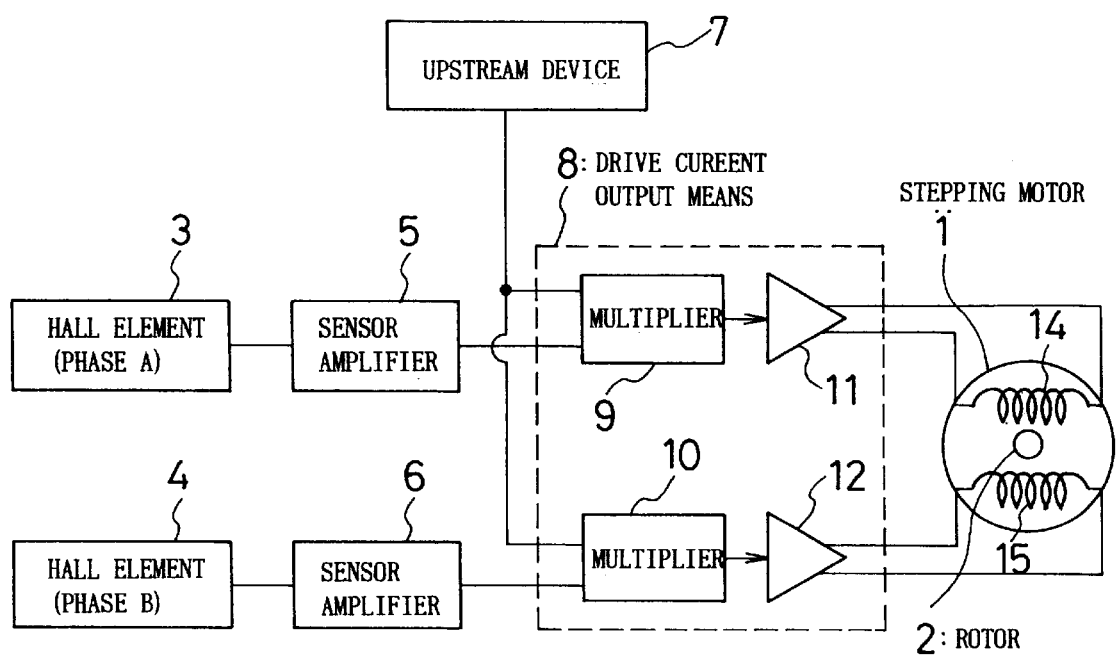
FIG. 1 is a drawing which shows the configuration of a stepping motor drive apparatus according to the present invention.
Figure 2:
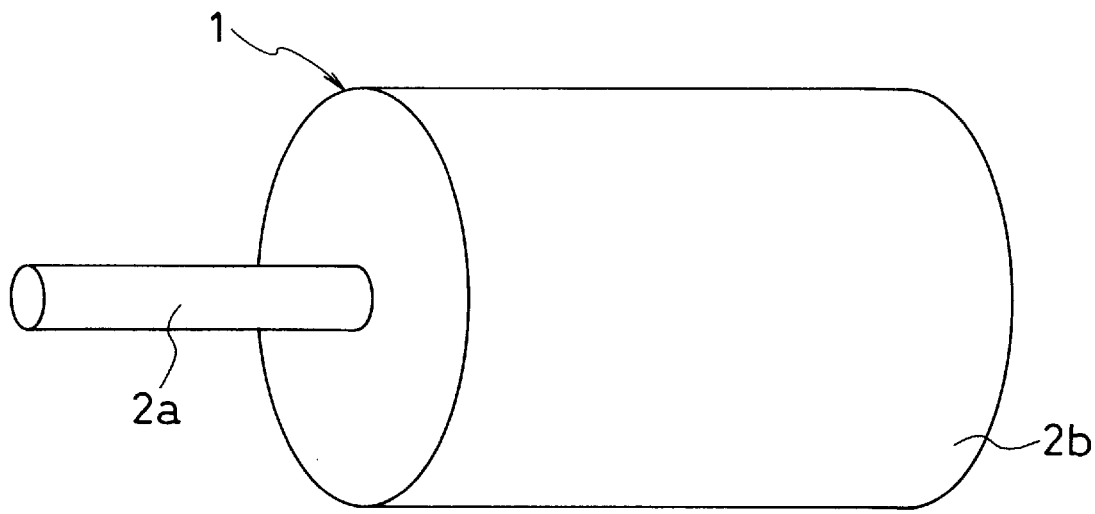
FIG. 2 is a perspective view which shows the outer appearance of a stepping motor according to the present invention.
Figure 3:
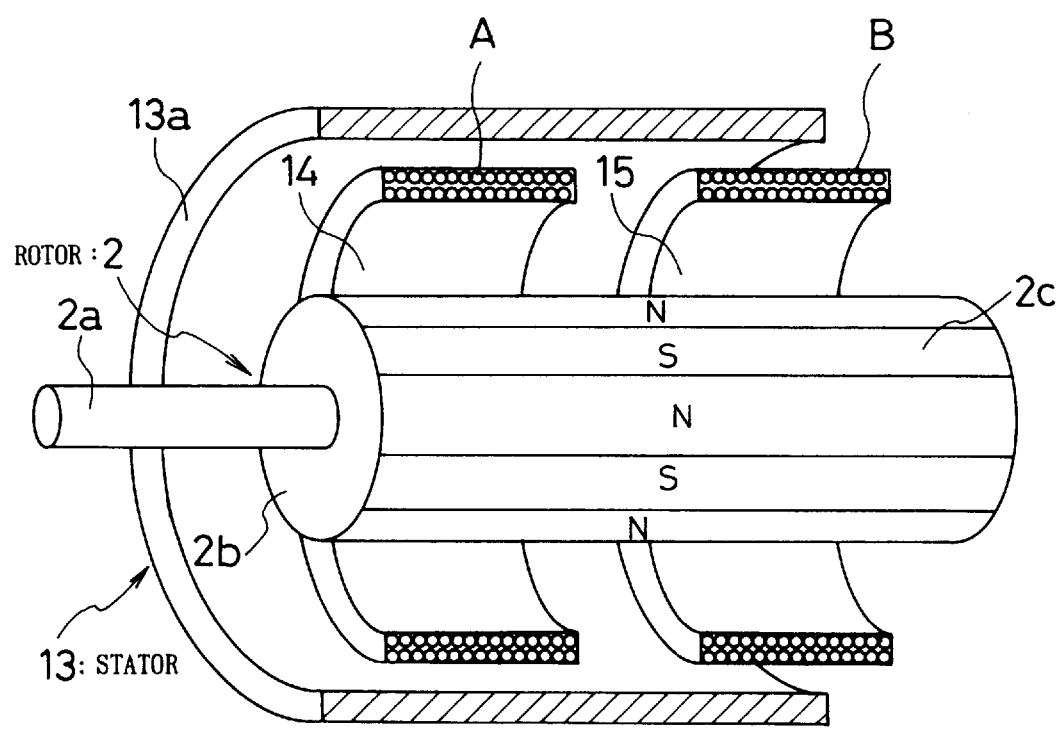
FIG. 3 is a partial perspective view which shows the positional relationship of a rotor to a frame and a coil.
Figure 4:
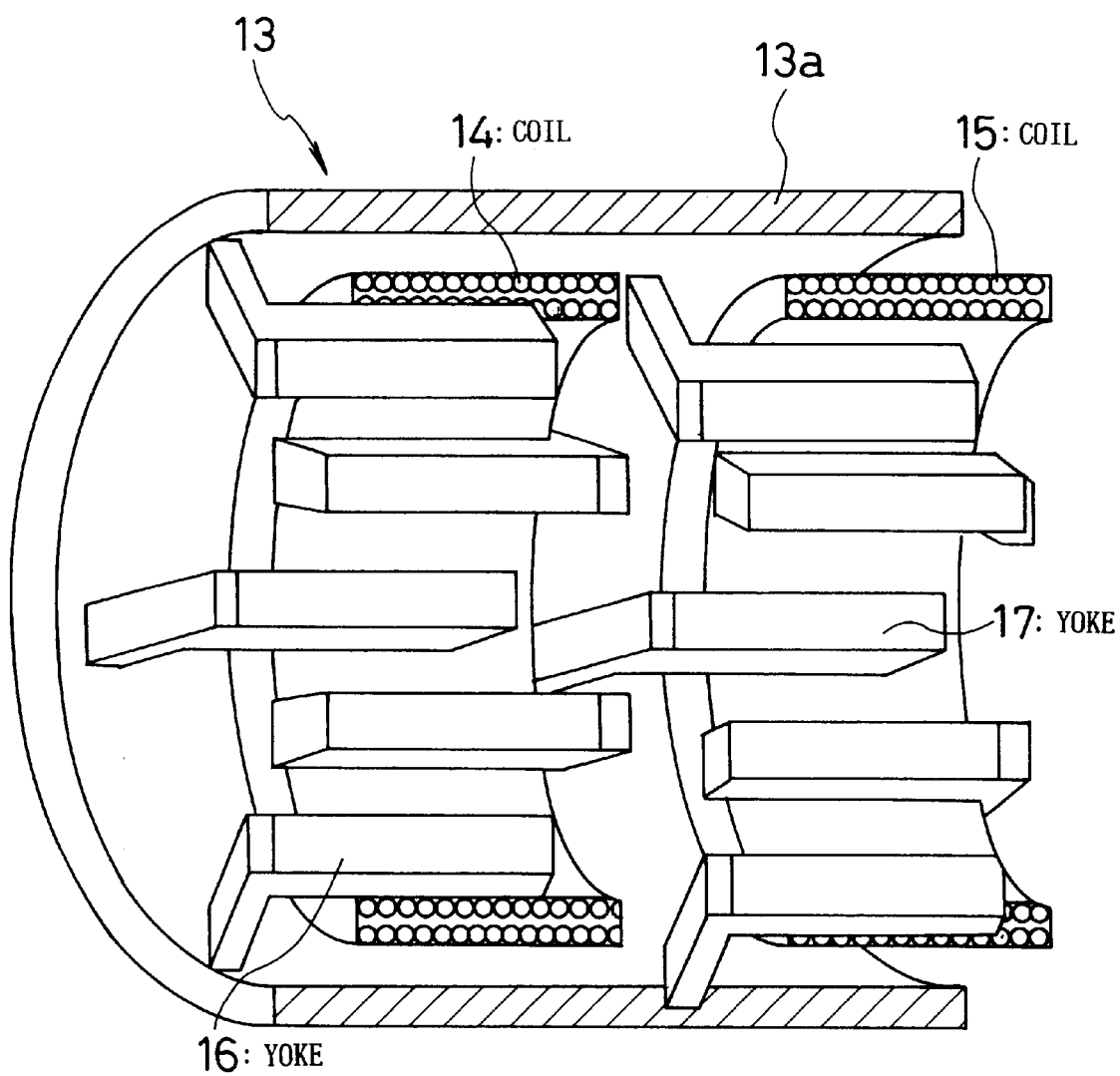
FIG. 4 is a partial perspective view which shows the positional relationship between a coil and a yoke.
Figure 5:
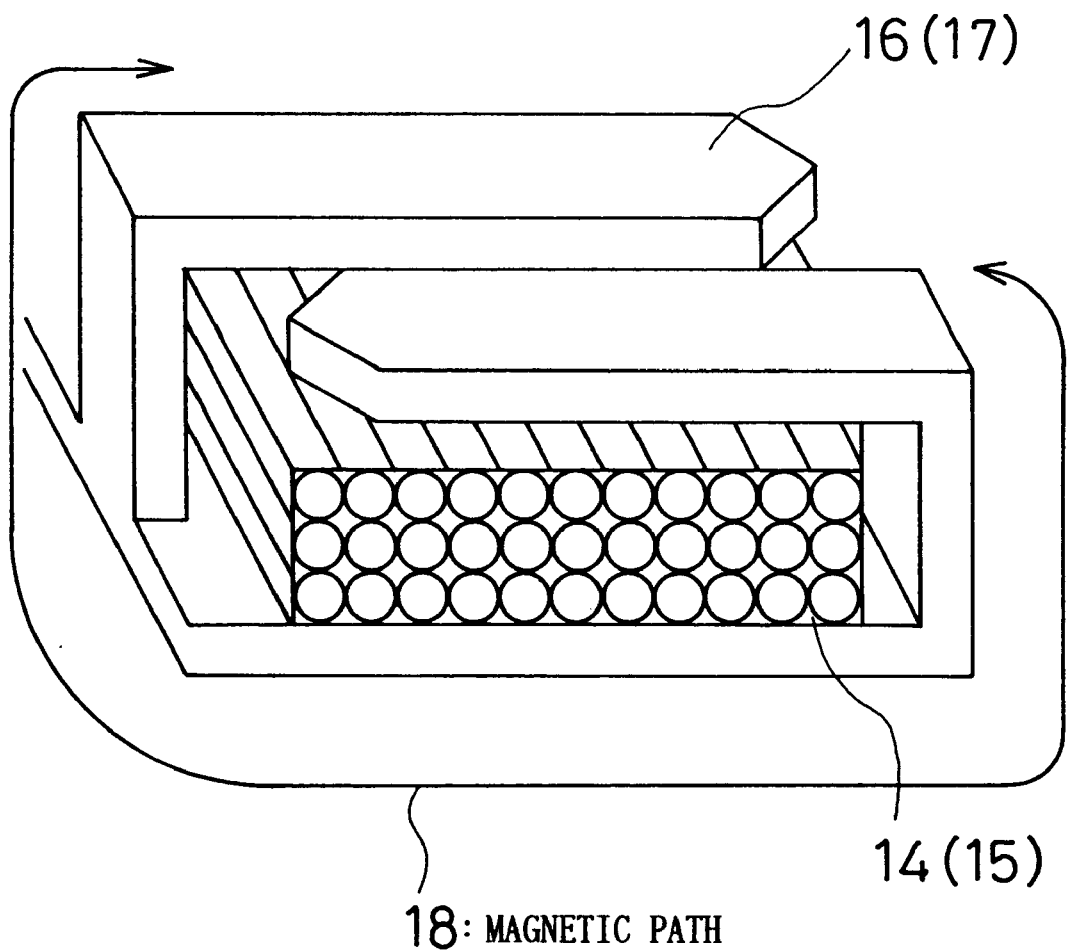
FIG. 5 is a perspective view which shows details of the positional relationship between the coil and yoke.
Figure 10:
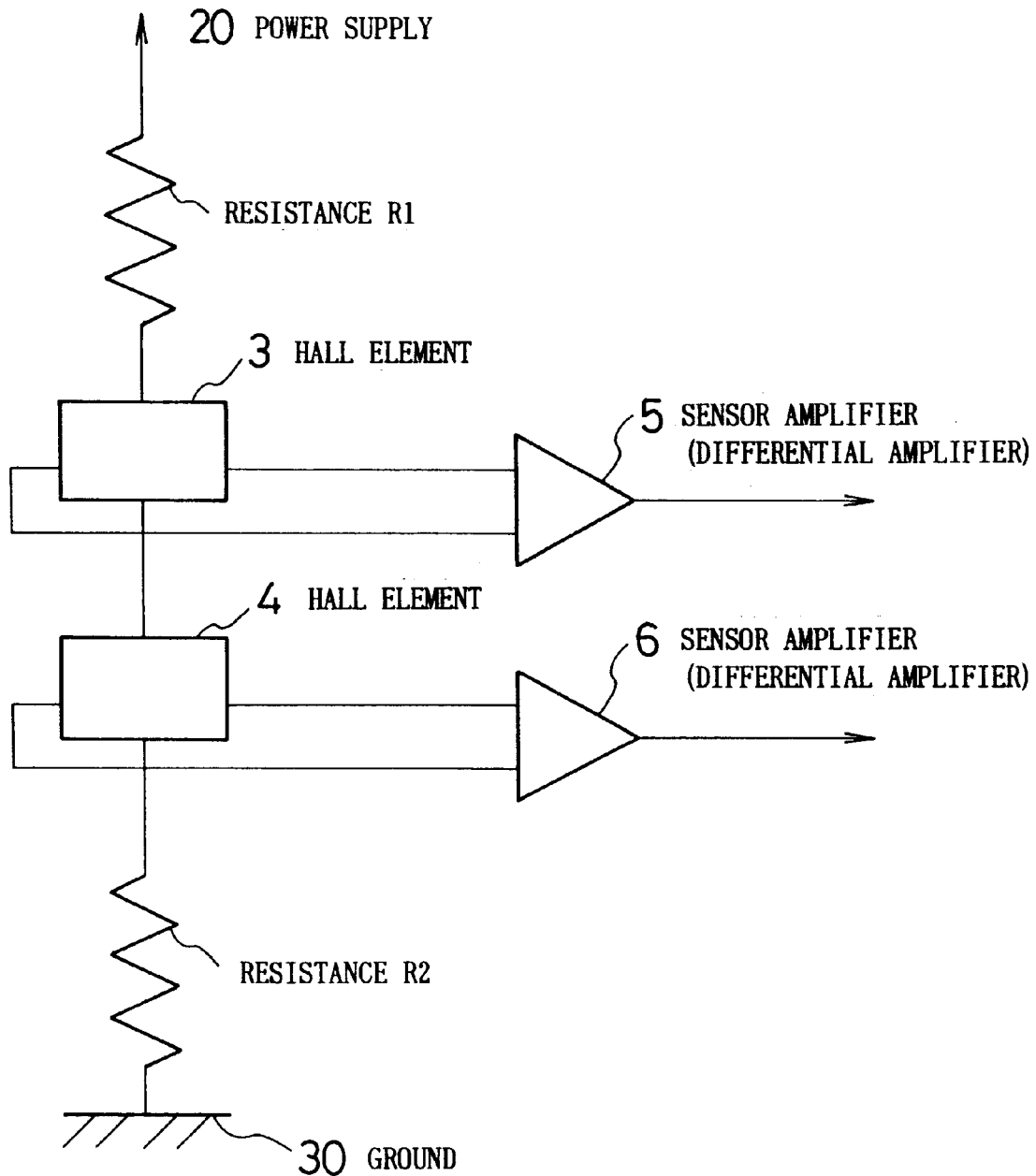
FIG. 10 is a circuit diagram which shows a sensor amplifier that is electrically connected to a Hall element.

FIG. 1 is a drawing which shows the configuration of a stepping motor drive apparatus according to the present invention, FIG. 2 is perspective view which shows the outer appearance of a stepping motor according to the present invention, FIG. 3 is a partial perspective view which shows the positional relationship between a frame and a coil, FIG. 4 is a partial perspective view which shows the positional relationship between a coil and yoke, FIG. 5 is perspective view which shows the positional relationship between a coil and yoke, and FIG. 10 is a circuit diagram which shows a sensor amplifier that is electrically connected to a Hall element.

As shown in FIG. 1, a stepping motor drive apparatus according to the present invention drives a stepping motor 1 that has the two phases A and B, this stepping motor drive apparatus having a Hall element 3 for phase A and a Hall element 4 for phase B, which are used to detect the position of the rotor 2 of the stepping motor 1, a sensor amplifier 5 that amplifies a detection signal that is output from the phase A Hall element 3, a sensor amplifier sensor 6 that amplifies a detection signal that is output from the phase B Hall element 4, and a drive current output section 8, which multiplies each of the detection signals output from the respective sensor amplifiers 5 and 6 by a torque command signal that is output from an upstream device 7 and which controls the output torque of the stepping motor 1, and outputs the resulting drive current.

The drive current output section 8 has a multiplier 9, which multiplies the detection signal that is output from by the sensor amplifier 5 by the torque command signal which is received as an output from the upstream device 7 and which corresponds to the generated torque of the stepping motor 1, a multiplier 10, which multiplies the detection signal that is output from the sensor amplifier 6 by the torque command signal which is received as an output from the upstream device 7 and which corresponds to the generated torque of the stepping motor 1, a power amplifier 11, which amplifies the drive current command signal for phase A that is output from the multiplier 9 and which outputs a phase A drive current, and a power amplifier 12, which amplifies the drive current command signal for phase B that is output from the multiplier 10 and which outputs a phase B drive current.

The Hall elements 3 and 4 detect a change in the magnetic field of the rotor 2, thereby detecting the position thereof, and output a detection signal. This detection signal, as will be described later, is a trigonometric function signal that has the same period as the excitation.

Because the detection signals which are output from the Hall elements 3 and 4 are very small, the sensor amplifiers 5 and 6 are preferably operational amplifiers, as shown in FIG. 10.

A resistance R1 is provided between the Hall element 3 and the power supply 20, and a resistance R2 is provided between the Hall element 4 and ground 30.

The multipliers 9 and 10 are, for example, commercially available analog multipliers.

The upstream device 7 that outputs the torque command signal is, to name some examples, an optical disk drive, a printer, a copying machine, a robot, or a machine tool, into which is incorporated a stepping motor.

The stepping motor 1, as shown in FIG. 3, has a rotor 2 and a stator 13, which is disposed so as to surround the rotor 2.

The rotor 2, as shown in FIG. 2 and FIG. 3, has a shaft 2a and a cylindrical permanent magnet 2b, which is mounted as one with the shaft 2a.

The sides of the rotor 2 have magnetized surfaces 2c, which are magnetized alternately as North and South poles, at a uniform interval.

In this embodiment, the rotor 2 has five pairs of North and South poles, so that there are 10 magnetized surfaces 2c around the periphery thereof.

The stator 13, as shown in FIG. 3 and FIG. 4, has a frame 13a, which is cylindrical and which surrounds the outside of the rotor 2, two coils 14 and 15, which are mounted to the frame 13a, and a plurality of yokes 16 and 17, each of which has an L-shaped cross-section, and which are formed as one with the frame 13a so as to cover each of the coils 14 and 15.

When drive current flows through coils 14 and 15, as shown in FIG. 5, a magnetic path 18 occurs in each of the yokes 16 and 17, and the end parts of the yokes 16 and 17 are magnetized as North and South poles. By reversing the drive current, the magnetic poles are reversed.

By reducing the size of the drive current, it is possible to change the magnetic force.

The coils 14 and 15 and the yokes 16 and 17 which are in opposition thereto, as shown in FIG. 4, are relatively positioned so that there is between them a 90-degree phase skew.

By changing the drive current that flows in the coils 14 and 15, the excitation condition of the yokes 16 and 17 is caused to change as North-South-North.

The rotor 2, according to the excitation condition thereof, can have its stopped position changed. The skew of 90 degrees in phase means that the N-S-N pole change in the yokes 16 and 17 is periodic, the phase between the motor phase between skewed by 90 degrees with respect to the period thereof.

Next, the operation of a stepping motor drive apparatus according to the present invention will be described.

The position of the rotor 2 of the stepping motor 1 is detected by the phase A Hall element 3 and the phase B Hall element 4.

The detection signal that is output by the phase A Hall element 3 is amplified by the sensor amplifier 5, after which it is input to the multiplier The multiplier 9 multiplies this by the torque command signal that is output from the upstream device 7, and outputs a phase A drive current command signal.

The detection signal that is output by the phase B Hall element 4 is amplified by the sensor amplifier 6, after which it is input to the multiplier 10.

The multiplier 10 multiplies this by the torque command signal that is output from the upstream device 7, and outputs a phase B drive current command signal.

The phase A drive current command signal that is output from the multiplier 9 is amplified by the power amplifier 11 and output as the phase A drive current.

The phase B drive current command signal that is output from the multiplier 10 is amplified by the power amplifier 12 and output as the phase B drive current. These output drive currents are caused to flow in the phase A coil 14 and the phase B coil 15.

Figure 6:
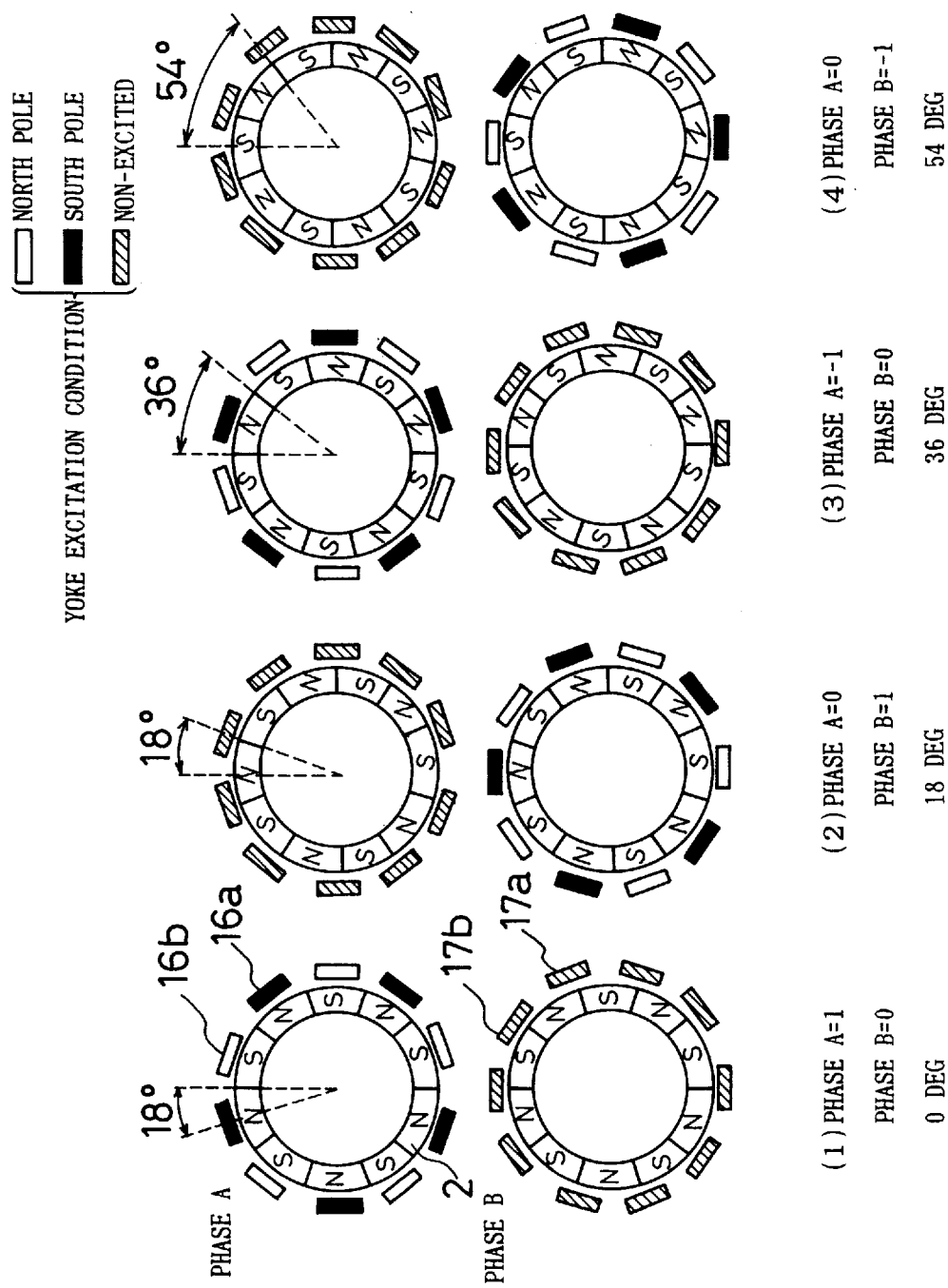
FIG. 6 is a drawing which illustrates the relationship between the current flowing in a coil and the associated stable position of the rotor.

FIG. 6 illustrates the positional relationship between the drive currents that flow in the coils 14 and 15 and the stable rotational position of the rotor 2.

In FIG. 6, the rotor 2 is common to both phase A and phase B, and as described above, the yokes 16 and 17 of the phase A and phase B, respectively, are disposed so as to be skewed by 90 degrees in phase.

The term "phase" used in this case is used in the sense that one period is a movement from one North pole to the neighboring North pole (with an intervening South pole), this being the excitation period of the stepping motor.

In the case of an embodiment of a stepping motor according to the present invention, 1 period is a rotational angle of 72 degrees.

As shown in FIG. 6, the phase A yoke 16 and the phase B yoke 17 are skewed by an absolute angle of 18 degrees, this being ¼ of the excitation period of 72 degrees of the stepping motor 1, so that the phase is skewed by 90 degrees.

FIG. 6 (1) shows the condition in which the rotor 2 is at 0 degrees, meaning that it is positioned at the origin point of the excitation period.

In this case, because drive current I flows in the phase A coil 14, but no drive current flows in the phase B coil 15, the yoke 16a is excited by a South pole and the yoke 16b is excited by a North pole, with yokes 17a and 17b being non-excited.

FIG. 6 (2) shows the condition in which the rotor 2 is has been rotated by 18 degrees, that is, in which it has rotated through ¼ of a period.

In this case, because drive current does not flow through the phase A coil 14 and drive current I flows through the phase B coil 15, the yokes 16a and 16b are non-excited, the yoke 17a is excited by a South pole, and the yoke 17b is excited by a North pole.

FIG. 6 (3) shows the condition in which the rotor 2 is at 36 degrees, that is, in which it has rotated through ½ of a period. In this case, the current -I flows in the phase A coil 14, and no drive current flows in the phase B coil 15, so that the yoke 16a is excited by a North pole, the yoke 16b is excited by a South pole, and the yokes 17a and 17b are non-excited.

FIG. 6 (4) shows the condition in which the rotor 2 is at 54 degrees, that is, in which it has rotated through ¾ of a period. In this case, no drive current flows in the phase A coil 14 and the current -I flows in the phase B coil, so that the yokes 16a and 16b are non-excited, the yoke 17a is excited by a North pole, and the yoke 17b is excited by a South pole.

Figure 7:
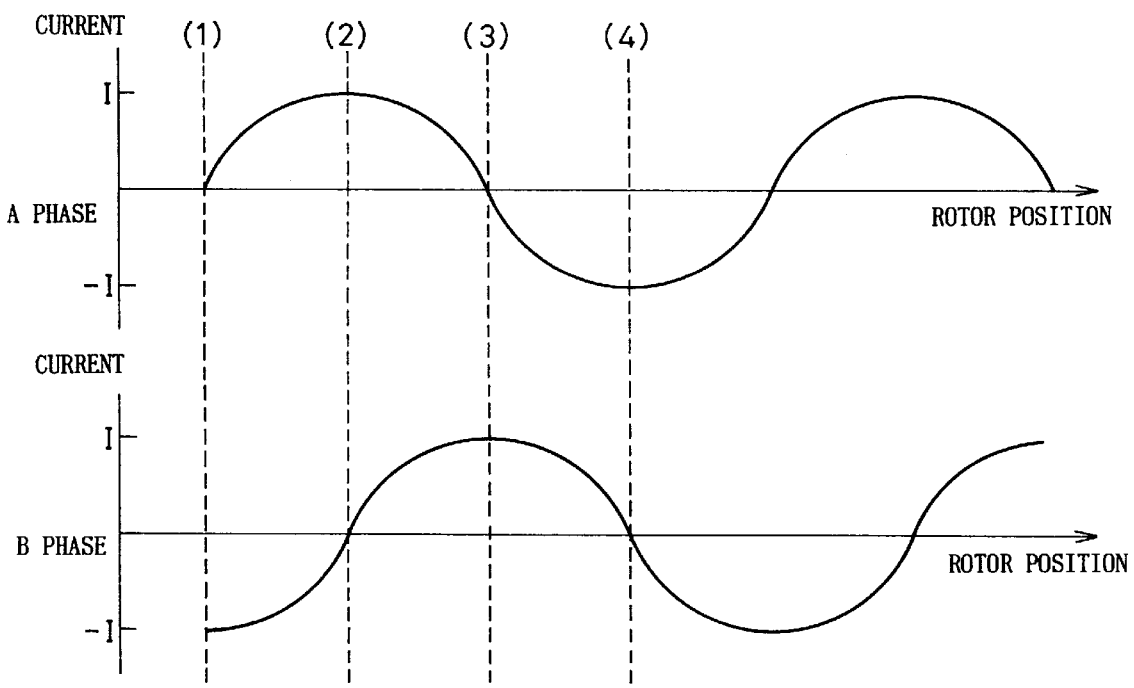
FIG. 7 is a waveform diagram which shows the relationship between the rotational position of the rotor and the drive current.

FIG. 7 is a waveform diagram which shows the relationship between the rotor 2 rotational position and the drive current. In FIG. 7, the horizontal axis represents the rotational position of the rotor 2, and the vertical axis represents the drive current. FIG. 7 (1) through (4) correspond to the rotational positions shown in FIG. 6 (1) through (4).

Note that although with the drive method that is shown in FIG. 6, the only stopped positions are (1) through (4), according to the excitation profile that is shown in FIG. 7, it is possible to stop at any arbitrary position.

In the case of a 2-phase stepping motor 1, the phase relationship between the drive phases is a 90-degree phase difference. Because of the phase difference between the drive phases, it is possible to arbitrarily establish the direction of rotation, and also to reverse the stepping motor.

For example, if there is only one phase, phase A, to rotate from position (1) to position (3) if the drive current is changed to a current of 0, it is possible to rotate to either position (1) or position (3), and there is no directionality.

In contrast to this, as shown in FIG. 7, in the case of rotating from position (2) to position (3), if no drive current is fed to phase A and a drive current I is caused to flow in phase B, rotation is made to position (3). On the other hand, if no drive current is fed to phase A, but a drive current of -I is caused to flow in phase B, rotation is made to position (1).

Figure 9:
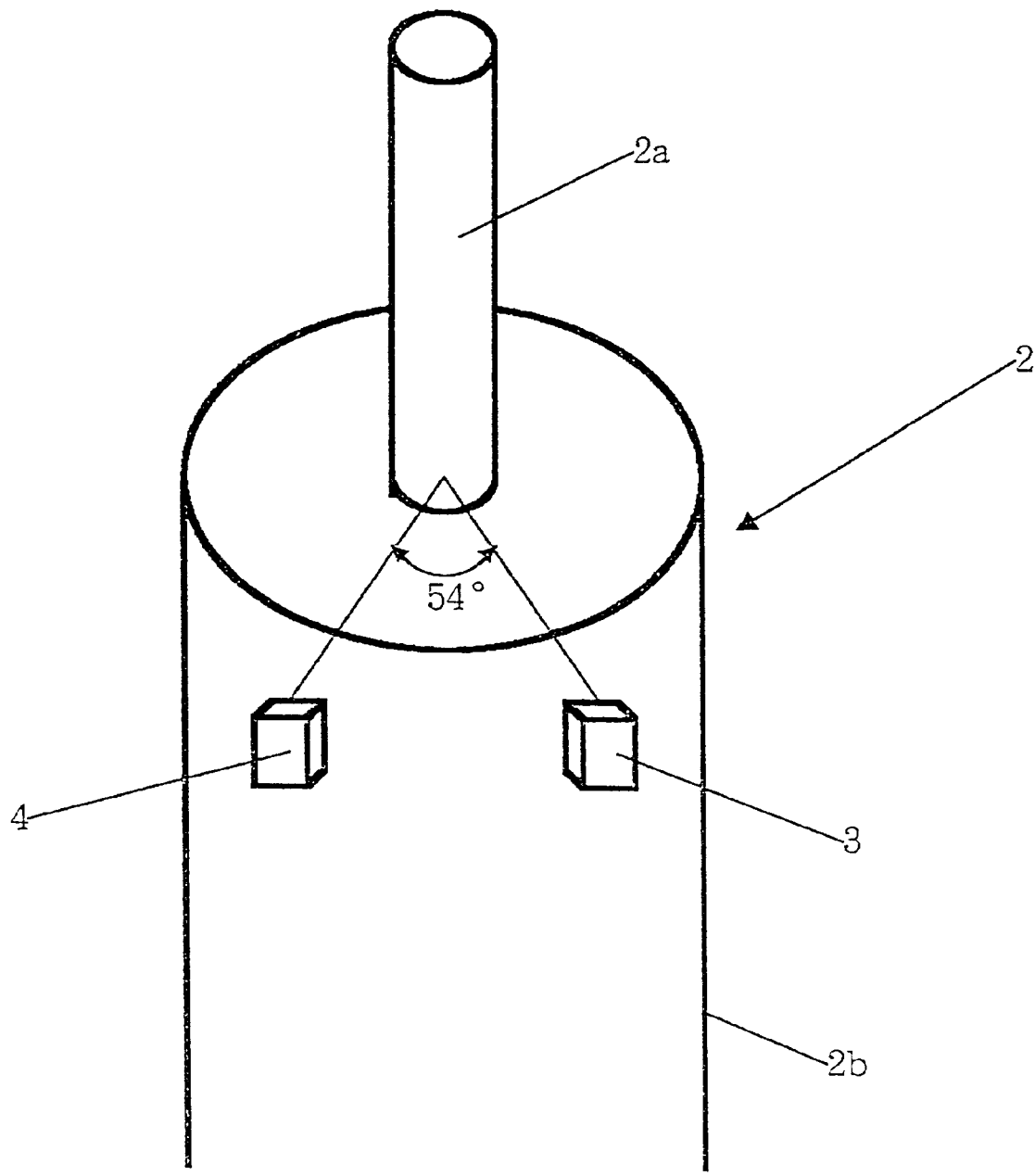
FIG. 9 is a perspective view which shows the position of the Hall element.

FIG. 8 (A) is a drawing which shows the position of the Hall elements, and FIG. 8 (B) is a waveform diagram which shows the relationship of between the rotational position of the rotor 2 and the sensor signal. FIG. 9 is a perspective view which shows the position of the Hall elements.

In an embodiment of a stepping motor drive apparatus according to the present invention, the two-phase drive currents $I_A$ and $I_B$ are applied to stepping motor 1 so as to satisfy the following conditions.

$$I_A = I_0 \sin(2\pi\theta_0/\theta_d + \pi/2)$$
$$I_B = -I_0 \cos(2\pi\theta_0/\theta_d + \pi/2) \quad (1)$$

In the above, $I_0$ corresponds to either a torque command or the speed command signal, and if $I_0$ is constant, constant torque is generated, and it is possible to perform torque control by varying $I_0$.

The $\theta_0$ in the above relationships is the current rotational angle of the motor, and $\theta_d$ is the rotational angle that corresponds to the excitation period.

For example, in the case of excitation five times over one period of the stepping motor 1, $\theta_d$ would be $2\pi/5$ (72 degrees).

In this case, torque is generated so that the rotor 2 is always rotated to the position $(2\pi\theta_0/\theta_d + \pi/2) \times (\theta_d/2\pi) = \theta_0 + \theta_d/4$.

If signals $S_A$ and $S_B$ shown as follows, are generated to satisfy the relationships;

$$S_A = \sin(2\pi\theta_0/\theta_d + \pi/2)$$
$$S_B = \cos(2\pi\theta_0/\theta_d + \pi/2) \quad (2)$$
$$I_A = I_0 S_A, \quad I_B = I_0 S_B \quad (3)$$

it is possible to apply the drive current as given by Equation (1).

The Hall elements 3 and 4 which are used as rotor position detection means in the present invention, detect the rotational angle θ of the motor, and are disposed so as to obtain the above-noted signal $S_A$ and $S_B$.

The signals $S_A$ and $S_B$ that are obtained by the Hall elements 3 and 4 are multiplied by the torque command signal $I_0$, which corresponds to the control signal, by the multipliers 9 and 10, thereby obtaining the drive currents $I_A$ and $I_B$ as indicated in Equation (1).

The Hall elements 3 and 4 convert magnetic force to an electrical signal, and output a signal that is responsive to the magnetic force. As shown in FIG. 8 (A) and FIG. 9, the phase A Hall element 3 and the phase B Hall element 4 are disposed in proximity to the magnetic surface 2c of the rotor 2, these being mounted, for example, to the inner wall of the frame 13a of the stator 13. The Hall elements 3 and 4 are separated by an angle of 54 degrees.

When the rotor 2 rotates, the signals shown in FIG. 8 (B) is generated. In FIG. 8 (B) the condition shown is that in which a North pole approaches a peak of the waveform, and a South pole approaches a value of the waveform.

To make it easier to understand the relationship between the positions of the Hall elements 3 and 4 and the rotor 2, the inverse electromotive voltage signals are also shown.

Therefore, if the drive currents are applied by using the signals from the Hall elements 3 and 4 because excitation is provided with a lead angle of 90 degrees, torque is constantly generated which attempts to rotate the rotor 2 to the position $\theta_0 + \theta_d/4$.

The present invention is not restricted to the above-described embodiment, it is possible to vary it, within the technical scope recited in the claims.

For example, it is possible to apply the present invention to a stepping motor that has three or more phases.

Additionally, the magnetization condition of the rotor 2 is not restricted to that shown in the drawings herein.

It is also possible to use a magnetoresistive element other than a Hall element as a rotor position detection means.

In the present invention, a separate aspect of the technical conception apart from those as explained above, is a method for driving a stepping motor.

The method for driving the stepping motor of the present invention, having a rotor with magnetic surface that is magnetized at a uniform interval to form North and South poles alternately and having a stator that has a plurality of excitation phases in opposition to said magnetic surface, and that is driven by the application of a drive current to each of the excitation phases of said stators, the excitation condition of the excitation phases changing with a fixed period, is defined such that the method thereof comprising the steps of, detecting a rotor position of said rotor with a rotor position detection means, outputting a detection signal that has the same period as said excitation period and which leads the rotor position by 90 degrees from said rotor position detection means, and driving said stepping motor by a drive current that is obtained as an output by multiplying the detection signal output from said rotor position detection means by a torque command signal that controls the output torque of said stepping motor.

In the method for driving a stepping motor according to the present invention, it is preferable that the rotor position detection means may be a sensor which detects a change in the magnetic field of said rotor.

And further in the method for driving a stepping motor according to the present invention, the rotor position detection means may preferably be a Hall element.

By virtue of the technical constitution of the present invention, which includes a rotor position detection, which detects the position of the rotor and outputs a detection signal responsive to that position that has the same period as the excitation period and leads it by 90 degrees, and a drive current output means, which multiplies the detection signal output by the rotor position detection means by a torque command signal that controls the output torque of the stepping motor, and which outputs a drive current, it is possible to use closed-loop control to achieve high accuracy and high torque output that is equivalent to that of a DC motor.

If a sensor that detects a change in the magnetic field of the rotor, such as a Hall element, is used as the rotor position detection means, it is possible to achieve a control system that is low in cost, compared with the case of using a high-cost sensor such as a rotary encoder or optical sensor.

Additionally, if the rotor position detection means is disposed in proximity to the rotor, although there is interference from the coil from the magnetic field of the coil, in the present invention because an analog signal is directly used to control the drive of the motor, compared with the case of using pulses, the influence from interference is small, so that faulty operation does not occur.

What is claimed is:

1. A stepping motor drive circuit for driving a stepping motor that has a rotor with a magnetic surface that is magnetized at uniform intervals to form North and South poles alternately and which has a stator that has a plurality of excitation phases in opposition to said magnetic surface of said rotor by applying a drive current to said excitation phases of said stator, thereby changing a magnetization condition of said excitation phases with a fixed period, said stepping motor drive circuit comprising:

a magnetic sensor for detecting a change in magnetic field of said rotor due to a change in rotor position, and for outputting a detection signal that has a period that is the same as the excitation period and a phase that leads the rotor position by 90 degrees; and a signal amplifier for multiplying said detection signal by a torque command signal from an upstream device so as to output a drive current for controlling the output torque of said stepping motor so as to permit close-loop positioning of said stepping motor.

2. A stepping motor drive circuit according to claim 1, wherein said magnetic sensor is a Hall element.

3. A stepping motor drive circuit according to claim 1, and comprising a magnetic sensor and signal amplifier for each excitation phase.

4. A stepping motor drive circuit according to claim 1, where said amplifier comprises an operational amplifier.

5. A stepping motor drive circuit according to claim 1, wherein said signal amplifier comprises an analog multiplier.

6. A stepping motor that has a rotor with magnetic surface that is magnetized at uniform intervals to form North and South poles alternately and which has a stator that has a plurality of excitation phases in opposition to said magnetic surface, and which is driven by the application of a drive current to each of the excitation phases of said stators, the excitation condition of the excitation phases changing with a fixed period, said stepping motor comprising a magnetic sensor for detecting a change in the magnetic field of said rotor due to a change in rotor position and for outputting a detection signal that has the same period as the excitation period and a phase which leads the rotor position by 90 degrees, and, a signal amplifier for multiplying the detection signal by a torque command signal from an upstream device for controlling the output torque of said stepping motor so as to permit close-loop positioning of said stepping motor.

7. A stepping motor according to claim 6, wherein said magnetic sensor is a Hall element.

8. A stepping motor according to claim 6, and comprising a magnetic sensor and signal amplifier for each excitation phase.

9. A stepping motor according to claim 6, wherein said amplifier comprises an operational amplifier.

10. A stepping motor according to claim 6, wherein said signal amplifier comprises an analog amplifier.

11. A method for driving a stepping motor that has a rotor with magnetic surface that is magnetized at uniform intervals to form North and South poles alternately and which has a stator that has a plurality of excitation phases in opposition to said magnetic surface, and that is driven by the application of a drive current to each of the excitation phases of said stators, the excitation condition of the excitation phases changing with a fixed period, said method comprising the steps of:

detecting a change in rotor position by sensing change in the magnetic field of said rotor using a magnetic sensor, and outputting a detection signal that has the same period as said excitation period and which leads the rotor position by 90 degrees; and multiplying the detection signal by a torque command signal from an upstream device so as to output a drive current for controlling the output torque of said stepping motor so as to permit close-loop positioning of said stepping motor.

12. A method for driving a stepping motor according to claim 11, wherein said magnetic sensor is a Hall element.

13. A method for driving a stepping motor according to claim 11, wherein the stepping motor comprises a magnetic sensor and signal amplifier for each excitation phase.

14. A method according to claim 11, wherein said amplifier comprises an operational amplifier.

15. A method according to claim 11, wherein said signal amplifier comprises an analog amplifier.

* * * * *